UNITED STATES PATENT OFFICE.

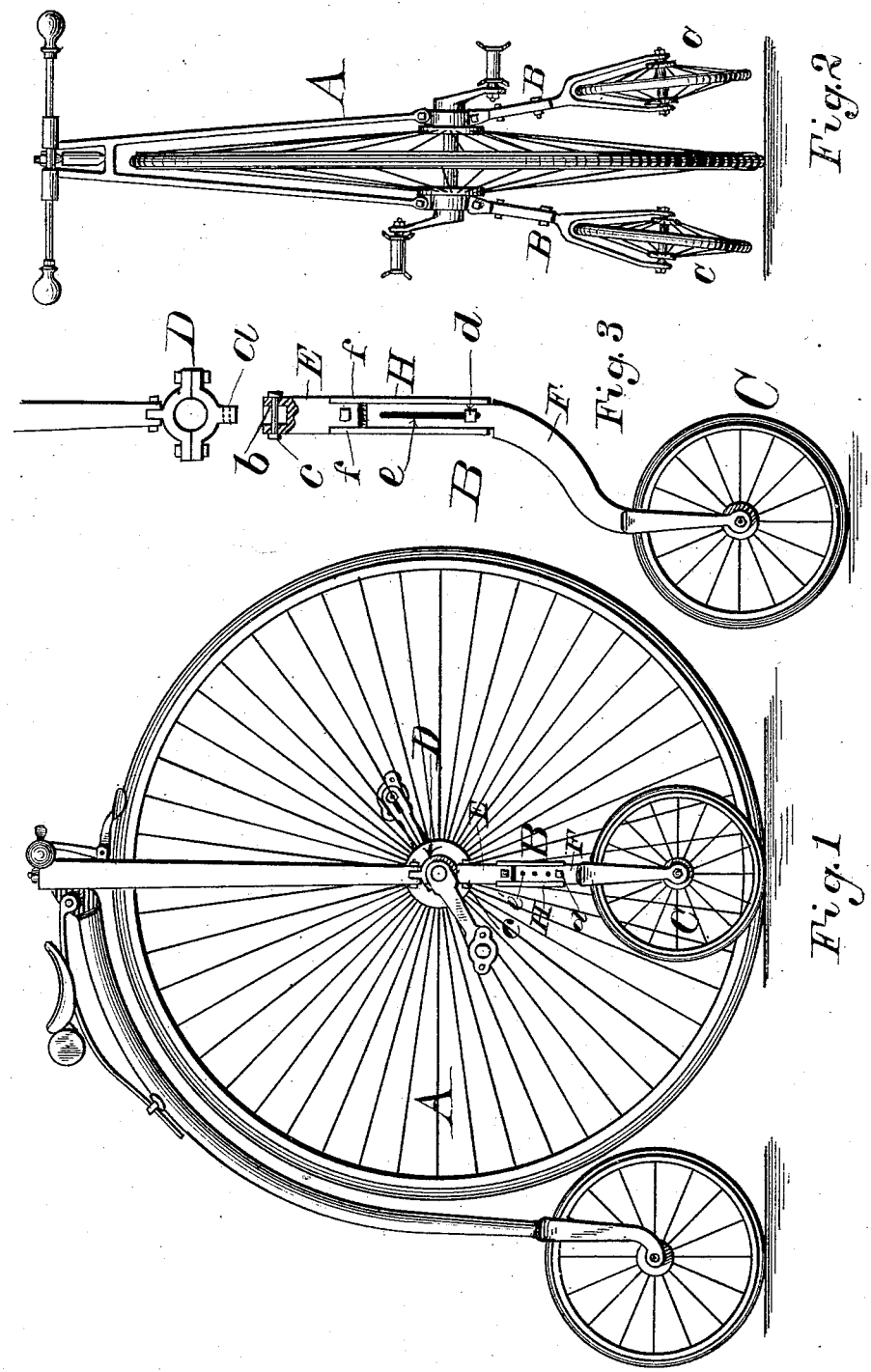

RUDOLPH TRAGARDH, OF CHICAGO, ILLINOIS.

VELOCIPEDE.

SPECIFICATION forming part of Letters Patent No. 264,374, dated September 12, 1882.

Application filed April 10, 1882. (No model.)

*To all whom it may concern:*

Be it known that I, RUDOLPH TRAGARDH, a citizen of the United States of America, residing at Chicago, in the county of Cook and State of Illinois, have invented a new and useful Equilibrial Attachment for Bicycles, of which the following is a specification.

The object of my invention is to provide an attachment for bicycles, which may be readily put onto or detached from said machine, for the purpose of assisting in preserving the equilibrium of and to facilitate progress in learning to ride said machine.

To this end my invention consists in attaching on each side of a bicycle an arm carrying a small wheel which runs on or is held a little above the ground on each side of the front wheel and maintains the machine in an upright position or prevents it from tipping over. This will be readily understood from the following description, with reference to the accompanying drawings, which form a part of this specification, and in which—

Figure 1 is a side elevation view of a bicycle provided with my improved equilibrial attachment; Fig. 2, a front elevation of the same with the small side wheels raised a little from the ground for the purpose hereinafter specified, and Fig. 3 a detailed view of the attachment enlarged and showing some modifications in the construction thereof.

A represents an ordinary bicycle. B is an arm bifurcated at its lower end and carrying a small wheel, C, and provided at its upper end with a socket, $b$, which fits over a projection, $a$, on the front bearing, D, of the machine, and which may be secured thereto by means of a bolt, $c$. The arm B is made of two pieces, E and F, connected by a plate, H, having on each side a flange, $f$, between which the ends of the pieces E and F fit. The piece E is bolted rigidly to the plate H; but the piece F is provided with a series of holes, $e'$, as shown in Fig. 1, or a slot, $e$, as shown in Fig. 3, through which the bolt $d$, which secures it to the plate H, passes, and thus renders it adjustable lengthwise for different sizes of bicycles.

The arm B may be made of any desired shape, and may be straight, as shown in Fig. 1, or curved to throw the small wheels C in front of or behind the center of the front wheel of the machine.

It is obvious that the small wheels C may be made to rest on the ground at all times, as shown in Fig. 1, and insure an upright position of the machine; or they may be raised a little, as shown in Fig. 2, and only come into contact with the ground as the machine leans too much in either direction.

It may be found advantageous for beginners at first to place the wheels on the ground. When they become accustomed to propelling the machine the wheels may be raised slightly and employed only to prevent the machine from falling over, as will be readily understood.

Having thus described my invention, what I claim as new, and desire to secure by Letters Patent, is—

1. An adjustable arm, B, carrying at its lower end a wheel, C, and provided at its upper end with a socket, $b$, and a bolt, $c$, in combination with a bearing, D, of a bicycle provided with a projection, $a$, substantially as and for the purpose set forth.

2. The combination of the arm B, consisting of the pieces E and F, the one, E, of which is provided with a socket, $b$, at one end and secured at the other to a plate, H, the other provided with a slot, $e$, and secured to plate H by bolt $d$, a wheel, C, bolt $c$, bearing D, and projection $a$, substantially as for the purpose described and shown.

In testimony whereof I affix my signature in presence of two witnesses.

RUDOLPH TRAGARDH.

Witnesses:
 FRANK JOHNSON,
 H. HARRISON.